United States Patent [19]

Ebneth et al.

[11] 4,390,588

[45] Jun. 28, 1983

[54] PROCESS FOR COATING CLOTH OF METALLIZED TEXTILE FIBERS AND THEIR USE FOR THE PRODUCTION OF MICROWAVE-REFLECTING ARTICLES

[75] Inventors: Harold Ebneth; Siegfried Klipfel, both of Leverkusen, Fed. Rep. of Germany

[73] Assignee: Bayer Aktiengesellschaft, Leverkusen, Fed. Rep. of Germany

[21] Appl. No.: 255,023

[22] Filed: Apr. 17, 1981

[30] Foreign Application Priority Data

May 6, 1980 [DE] Fed. Rep. of Germany ....... 3017204

[51] Int. Cl.[3] ....................... B32B 15/14; B32B 15/20; B05D 3/02

[52] U.S. Cl. ................................ 428/263; 427/383.1; 427/389.9; 427/404; 427/412; 428/265; 428/288; 428/423.9; 428/424.4; 428/424.6; 428/425.8

[58] Field of Search ..................... 427/389.9, 404, 412, 427/383.1; 428/263, 265, 288, 423.9, 424.4, 424.6, 425.8, 425.9

[56] References Cited

U.S. PATENT DOCUMENTS

| | | | |
|---|---|---|---|
| 3,660,138 | 5/1972 | Gorrell | 428/425.8 |
| 3,708,335 | 1/1973 | Fujiwara et al. | 117/226 |
| 4,201,825 | 5/1980 | Ebneth | 428/263 |

FOREIGN PATENT DOCUMENTS

| | | |
|---|---|---|
| 10711 | 10/1979 | European Pat. Off. . |
| 1038871 | 8/1966 | United Kingdom . |
| 1162873 | 8/1969 | United Kingdom . |

OTHER PUBLICATIONS

Kunststoff-Galvanisierung, Handbuch für Theorie und Praxis, Eugen G. Leuze Verlag, Saulgau 1973.

*Primary Examiner*—Michael R. Lusignan
*Attorney, Agent, or Firm*—Gene Harsh; Lawrence S. Pope; Aron Preis

[57] ABSTRACT

This invention relates to a process for increasing the abrasion and water resistance of metallized cloth by applying a coating containing free isocyanate groups and, optionally by an additional coating which process renders the textile materials suitable for use in the production of objects which can be detected by radar.

10 Claims, No Drawings

PROCESS FOR COATING CLOTH OF METALLIZED TEXTILE FIBERS AND THEIR USE FOR THE PRODUCTION OF MICROWAVE-REFLECTING ARTICLES

FIELD OF THE INVENTION

The invention relates to a process for coating metallized fiber fabrics, particularly suitable for producing articles which reflect radar waves.

DESCRIPTION OF THE PRIOR ART

The application of thin metal layers to the surface of textile fibers in known in general and may be carried out by any of several processes described in the literature for plastic materials, for example, in "Kunststoff-Galvanisierungs-Handbuch für Theorie und Praxis", Eugen G. Leuze-Verlag, Saulgau 1973, and in German Auslegeschrift No. 2,743,768. Because of their ability to reflect electromagnetic waves, metallized sheet-form textiles of this type are particularly suitable for the manufacture of objects, such as life jackets or the roofs of sea-rescue stations which are intended to be readily detectable by microwaves. On objects of this type, however, the thin metal layer covering the surface of the sheet-form textile material has to be protected by a suitable coating against mechanical wear and against the influence of seawater. However, it has been found that suitable, permeable to radar wave coating materials, such as natural rubber, PVC or polyvinyl acetate, adhere very poorly to metallized textile surfaces. For example, in the case of a nickel-plated filament yarn fabric coated with cross-linked polyvinyl acetate, the bond strength of the coating (as measured according to DIN 53 357) amounts to only about 1.5 to 2 N. It has surprisingly been found that the bond strength of coatings such as these can be increased quite considerably by first applying a coating system containing free isocyanate groups to the metallized sheet-form textile and preferably applying an additional layer, in particular a layer of the type mentioned above, before the coating system hardens. It is less preferred to use polyurethane alone for the coating as a whole because the relatively thick polyurethane coatings thus required can lead to a reduction in the microwave reflectivity of the metallized sheet-form textile.

BRIEF SUMMARY OF THE INVENTION

Accordingly, the present invention relates to a process for increasing the abrasion and water resistance of cloth of metallized textiles which process is characterized in that the metallized textile is coated with (A) a reactive polyurethane system, which may be dissolved in an organic solvent, containing from 0.5 to 15% by weight, preferably from 1 to 10% by weight, based on solids, of free isocyanate groups and, optionally, (B) an additional coating characterized by its permeability to radar waves before (A) hardens and the coating is subsequently hardened in known manner, optionally by heating and the removal of any solvents used.

DETAILED DESCRIPTION OF THE INVENTION

The process according to the invention may be applied to any cloth of metallized textiles. As already mentioned, however, metallized textiles according to German Auslegeschrift No. 2,743,768 are preferred. Suitable metals are, for example, nickel, cobalt, copper, gold, silver and their alloys, for example Ni-Fe combinations. According to the invention, nickel, cobalt and copper are preferred.

As reactive polyurethane systems suitable in the process of the invention, any so-called "two-component polyurethanes" may be used for the first coat containing free isocyanate groups to be applied to the cloth of metallized textile in the first stage of the process according to the invention. Polyurethanes of this type are reactive systems consisting, for example, of a preadduct containing isocyanate groups and a suitable chain extender, generally an aromatic diamine, which are cast or sprayed onto the substrate either separately or simultaneously, optionally diluted in a solvent. Processes of this type are described, for example, in the incorporated by reference German Pat. Nos. 838,826 and 872,268; German Auslegeschriften Nos. 1,023,449 and 1,240,656 (U.S. Pat. No. 3,281,396) and, in particular, German Auslegeschrift No. 1,570,524 (U.S. Pat. No. 3,475,266); German Auslegeschrift No. 2,637,115 (U.S. Pat. No. 4,108,842) and German Offenlegungsschrift No. 2,826,232 and in the literature cited therein.

Alternatively, it is also possible to synthesize two-component polyurethanes from a low molecular weight polyisocyanate and a relatively high molecular weight (approximately 2000 to 50,000) pre-adduct which still contains isocyanate-reactive groups, particularly hydroxyl groups. Suitable starting components are described, for example, in German Pat. No. 957,294; German Auslegeschrift No. 1,012,456 and German Offenlegungsschrift No. 2,221,756 (U.S. Pat. No. 3,904,396), all incorporated herein by reference.

In some cases, it may be of advantage to use two-component polyurethane systems in which either the polyisocyanate component or the isocyanate-reactive component (generally a polyamine) is blocked in known manner in such a way that the polyaddition reaction only begins upon heating to temperatures above about 100° C. Examples of such two-component polyurethane systems are NCO-prepolymers blocked with the usual blocking agents (phenols, lactams and, in particular, oximes) which may contain organic solvents and may be cross-linked, for example with polyamines. The blocked prepolymers described in the incorporated by reference German Offenlegungsschrift No. 2,814,079 are representative of these NCO-prepolymers. Another example of the above-mentioned type of blocked two-component polyurethanes are mixtures of NCO-prepolymers and a complex of alkali halides and aromatic polyamines, of the type described, for example, in U.S. Pat. No. 3,755,261.

It is also possible to use isocyanate-group-containing pre-adducts of low molecular weight polyisocyanate and compounds containing isocyanate-reactive groups, of the type mentioned in the publications cited above, on their own, i.e. in the absence of a cross-linking agent, in the process according to the invention. This is possible in particular when, as is preferred in accordance with the invention, the coating composition containing free isocyanate groups is applied in a layer thickness of only at most 0.1 mm as an undercoat for a second coating of another material.

As already mentioned, it is preferred in accordance with the invention to apply a second coating based on any coating composition characterized in its permeability to radar waves before the reactive polyurethane system containing free isocyanate group hardens. In addition to natural rubber, any plastics of the type described for example in the incorporated by reference German Offenlegungsschrift No. 2,348,662 may be used for the second coating, Coatings of natural rubber, flexible PVC and polyvinyl acetate or copolymers of ethylene and vinyl acetate are particularly preferred because of their high permeability to microwaves, while polyurethane layers, particularly in the case of relatively thick coatings, are frequently less suitable because they generally absorb electromagnetic waves, precisely in the wavelength range of ship's radar (approximately 9.4 GHz). The polymers of vinyl acetate and copolymers of vinyl acetate containing up to 70% by weight (based on polymer) of ethylene are particularly suitable for the second stage of the process according to the invention. They may be used either in the form of cross-linked aqueous dispersions or, preferably, in uncross-linked form and may be hardened during or after the hardening of the first coat by means of suitable cross-linking agents, for example, by the action of peroxides, percarbonates or, with particular preference, $\beta$-radiation. Processes of this type are described, for example, in German Pat. Nos. 1,116,394; 1,136,485; 1,181,404; 1,206,848; 1,222,887; 1,495,767 and 1,669,151; German Auslegeschrift No. 1,237,311 and German Offenlegungsschriften Nos. 1,769,698 and 2,314,515, all incorporated by reference herein. It is of course also possible to use polymers or copolymers based on vinyl acetate which are partially hydrolyzed, which, because of the reaction then possible with the free isocyanate groups of the first coat, lead to extremely good adhesion between the coating and the metallized textile to be coated.

After the application of the reactive polyurethane system containing isocyanate groups, and optionally an additional coating composition, the coating is hardened in a known manner, preferably by passing the coated metallized cloth through a heating duct in which the isocyanate groups react with the cross-linker or with a moisture while any solvents present are simultaneously evaporated. In cases where a coating based on vinyl acetate polymers or copolymers is used, it may be simultaneously, or subsequently, cross-linked by the action of radiation, for example, by $\beta$-radiation.

The process according to the invention is illustrated by the following Examples in which the quantities quoted represent parts by weight or percent by weight, unless otherwise idicated.

EXAMPLES

The metallized cloth of textile material used in the Examples was obtained in accordance with the following general procedure:

A 100% polyacrylonitrile filament yarn fabric having the following textile construction:

warp and weft:

238 dtex (effective) of dtex 220 f 96 z 150, 38.5 warp filaments/cm and 27 weft filaments/cm;

weave: twill 2/2;

weight: 155 g/m$^2$;

is immersed at room temperature in a hydrochloric acid bath (pH$\leqq$1) of a colloidal palladium solution according to German Auslegeschrift No. 1,197,720. After a residence time of up to about 2 minutes, during which it is kept in gentle motion, the material is removed, rinsed with water at room temperature and then placed for about 1.5 minutes in 5% sodium hydroxide solution at room temperature. The fabric is then rinsed with water at room temperature for about 30 seconds and introduced at room temperature into a solution consisting of 0.2 mol/l of nickel (II) chloride, 0.9 mol/l of ammonium hydroxide and 0.2 mol/l of sodium hypophosphite into which solution ammonia is introduced such that the pH-value amounts to about 9.4 at 20° C. After only 10 seconds, the sample begins to darken in color through the deposition of nickel. After 20 seconds, the sample floats to the surface with evolution of hydrogen gas and is already completely covered with nickel.

The sample is left in the metal salt bath for about 20 minutes, removed, rinsed and dried. In this 20 minute period, the sample has taken up about 40% by weight of nickel metal.

The metallized filament yarn fabric showed the values quoted in Table 1 for microwave reflection and absorption in transmission, as measured by the process described for example, in H. Groll, Mikrowellentechnik, F. Vieweg & Sohn, Braunscherig, 1969, pages 353 et seq. The reflection loss is expressed in dB. The effect of standing waves in the region preceding the object to be measured, (interfacial reflection) was eliminated by using a wide-band frequency-modulated radiation of constant power, for example 1 to 1.5 GHz etc.

TABLE 1

| | 1-1.5 | | 2-2.4 | | 7-8 | | 11-12 | | 35-36 | |
|---|---|---|---|---|---|---|---|---|---|---|
| GHz | T | R | T | R | T | R | T | R | T | R |
| dB | 35 | 0.15 | 35 | 0.15 | 32 | 0.1 | 32 | 0.4 | 27 | 2.4 |
| | (37) | — | (38) | — | (33) | — | (33) | — | (30) | — |

Values in brackets: sample turned through 90°
T = absorption in transmission, as measured in dB (decibels)
R = reflection loss, as measured in dB (decibels)

EXAMPLE 1

The nickel-plated filament yarn fabric is coated with a mixture of 100 g of a 30% solution (in ethyl acetate) of a hydroxyl-group-containing prepolymer, (of 80 parts of a hexane diol/adipic acid polyester having a molecular weight of 800 and 20 parts of an isomer mixture of 65% of 2,4- and 35% of 2,6-tolylene diisocyanate) and 50 g of a 75% solution (in ethyl acetate) of a triisocyanate of 3 mols of 2,4-tolylene diisocyanate and 1 mol of trimethyl propane and 50 g of a 10% solution of titanium tetrabutylate in ethyl acetate as an accelerator. The layer of thickness is approximately 1 mm.

On completion of the chemical reaction, 170 mm long and 15 mm wide strips are cut from the coated nickel-plated fabric in accordance with DIN 53 357 and subjected to the bond/tensile strength test.

In a standard test atmosphere of 23° C./50% relative humidity, a bond/tensile strength of 11 to 12 [N] was measured for a feed rate of 200 mm/minute and a separation angle of 90°.

EXAMPLE 2

A polyacrylonitrile filament yarn fabric, nickel-plated as described above, is coated with the isocyanate-containing first coat used in Example 1 in a layer thickness of approximately 0.05 mm and then with a flexible PVC layer in a thickness of 1 mm.

The flexible PVC layer consists of 50 parts of emulsion PVC, 50 parts of plasticizer (dioctyl phthalate) and standard commercial stabilizers of the type generally known in practice.

After the flexible PVC layer has been oven-hardened at approximately 130° C., 170 mm long and 15 mm wide test strips are cut from the coated metallized fabric and the bond/tensile strength of the PVC covering is measured in accordance with DIN 53 357.

In a standard test atmosphere of 23° C./50% relative humidity, a bond/tensile strength of 10 [N] is measured for a feed rate of 200 mm/minute and a separation angle of 90°.

The same nickel-plated fabric coated with the same flexible PVC layer, but without the isocyanate-containing undercoat, showed a bond/tensile strength under the same conditions of 1.5 [N].

EXAMPLE 3

A polyacrylonitrile filament yarn fabric, nickel-plated in accordance with the above procedures, is coated with the isocyanate-containing first coat described in Example 1 in a layer thickness of approximately 0.05 mm and then with an approximately 1 mm thick, orange-colored, uncross-linked polyvinyl acetate layer. After the first coat has been oven-hardened at approximately 130° C., the PVA layer is physically cross-linked by radiation, preferably β-radiation.

After cross-linking of the PVA layer, 170 mm long and 15 mm wide test strips are cut from the coated, orange-colored metallized fabric and the bond/tensile strength of the PVA covering is measured in accordance with DIN 53 357.

In a standard test atmosphere of 23° C./50% relative humidity, a bond/tensile strength of 12 [N] is measured for a feed rate of 200 mm/minute and a separation angle of 90°.

The same nickel-plated fabric coated with a cross-linked PVA layer, but without the isocyanate-containing undercoat, showed a bond/tensile strength under the same conditions of 1.9 [N].

The coated fabric shows the following absorption behavior in the microwave range:

TABLE 2

| | 1-1.5 | | 2-2.4 | | 7-8 | | 11-12 | | 35-36 | |
|---|---|---|---|---|---|---|---|---|---|---|
| GHz | T | R | T | R | T | R | T | R | T | R |
| dB | 42 (43) | 0.1 | 38 (39) | 0.1 | 36 (37) | 0.1 | 36 (37) | 0.4 (0.5) | 33 | 1.8 (2) |

Values in brackets: sample turned through 90°.

Very similar results are obtained when a copolymer of 55 parts of ethylene and 45 parts of vinyl acetate is used instead of polyvinyl acetate for coating the fabric provided with the undercoat containing isocyanate groups and is subsequently cross-linked by β-radiation or chemically, for example with peroxide.

What is claimed is:

1. A process for increasing the abrasion resistance and water resistance of cloth textiles metallized by direct deposition, comprising (A) coating said cloth with a reactive polyurethane system which may be dissolved in an organic solvent, containing from 0.5 to 15% by weight, based on solids, of free isocyanate groups and optionally, (B) applying an additional coating characterized by its permeability to radar waves before said (A) coating is hardened, (C) hardening the coating in a known manner, optionally by heating and of simultaneous removal of any solvents used.

2. The process of claim 1, wherein said (A) contains from 1 to 10% by weight of free isocyanate groups.

3. The process of claim 1 or 2 wherein said reactive polyurethane system comprises a prepolymer containing free isocyanate groups and optionally a polyamine and/or a polyol as cross-linker.

4. The process of claim 1 or 2 wherein said reactive polyurethane system comprises a polyisocyanate and a prepolymer containing free hydroxyl groups.

5. The process of claim 1 wherein said isocyanate groups of said reactive polyurethane system are blocked.

6. The process of claim 1 or 2 wherein said reactive polyurethane system contains a cross-linker containing blocked amino groups.

7. The process of claim 1 wherein said reactive polyurethane system is applied as a first coat in a layer thickness of at most 0.1 mm.

8. The process of claim 1 wherein said additional coating is selected from the group consisting of natural rubber, PVC, polyvinyl acetate and copolymers of ethylene and vinyl acetate.

9. The process of claim 1 wherein said additional coating is cross-linked.

10. Coated, metallized cloth textiles produced in accordance with the process of claim 1.

* * * * *